United States Patent [19]

Dietz

[11] 4,118,656
[45] Oct. 3, 1978

[54] NORTH-SOUTH PINCUSHION DISTORTION CORRECTION CIRCUIT

[75] Inventor: Wolfgang Friedrich Wilhelm Dietz, New Hope, Pa.

[73] Assignee: RCA Corporation, New York, N.Y.

[21] Appl. No.: 829,499

[22] Filed: Aug. 31, 1977

[51] Int. Cl.² .............................................. H01J 29/56
[52] U.S. Cl. .................................... 315/371; 315/393
[58] Field of Search ....................... 315/370, 371, 393

[56] References Cited

U.S. PATENT DOCUMENTS 4,041,354  8/1977  Haferl ................................. 315/371

*Primary Examiner*—T.H. Tubbesing
*Assistant Examiner*—T. M. Blum
*Attorney, Agent, or Firm*—Eugene M. Whitacre; Paul J. Rasmussen

[57] ABSTRACT

A first capacitor is coupled in parallel with a vertical deflection winding and the two are coupled to a source of horizontal rate energy by means which permit the capacitor to be charged with decreasing and increasing amounts of horizontal rate energy during respective first and second portions of each vertical deflection interval. The discharge of the first capacitor through the winding produces the vertical rate sawtooth scanning current therein. A second capacitor and impedance means coupled in circuit with the first capacitor are responsive to the horizontal rate energy to alter the shape of the generally sawtooth shaped horizontal rate voltage developed across the capacitors for producing a substantially symmetrical horizontal rate parabolic current component superimposed on the vertical rate sawtooth scanning current during each horizontal trace interval during the vertical trace interval for effecting north-south pincushion distortion correction current in the vertical winding.

5 Claims, 11 Drawing Figures

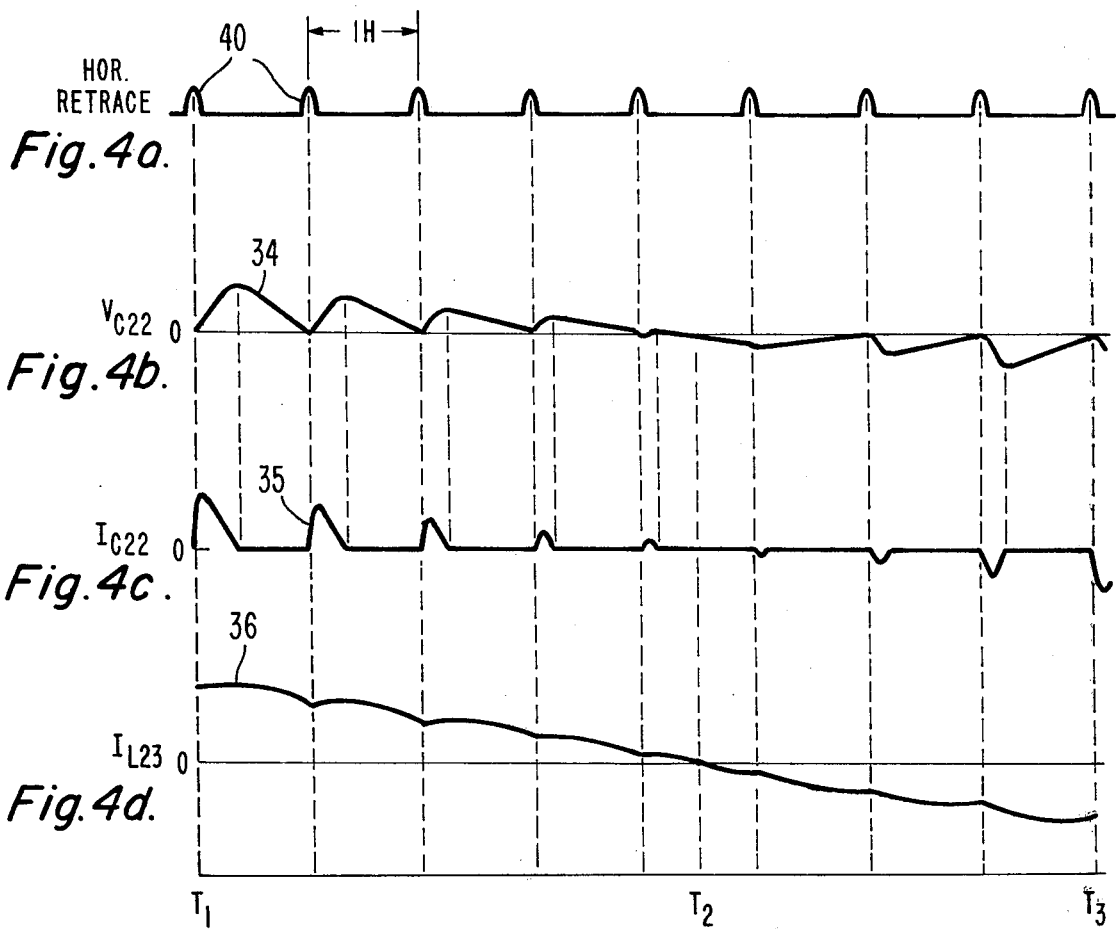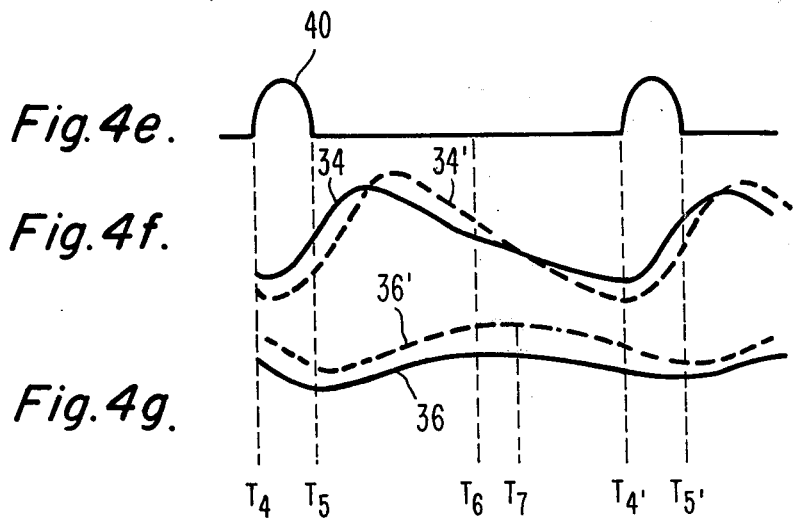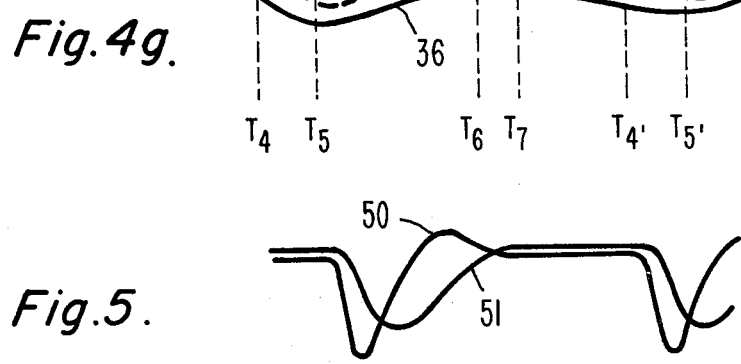

NORTH-SOUTH PINCUSHION DISTORTION CORRECTION CIRCUIT

BACKGROUND OF THE INVENTION

This invention relates to north-south pincushion distortion correction circuits suitable for use with television display systems.

North-south pincushion distortion is seen as a bowing inwardly of horizontal scanning lines of a raster towards the center of the raster. This distortion is caused primarily by the deflection of the scanning beams, having a given radius from their deflection center to the center of a viewing screen, over the viewing screen which has a larger radius of curvature. As the beam deflection angle of the picture tube increases, and as flatter viewing screens are utilized, the pincushion distortion increases.

It is known that north-south pincushion distortion can be corrected by modulating the vertical rate sawtooth scanning current at the horizontal rate with a properly phased parabolic wave or sine wave approximation of a parabolic wave. This correction component decreases in amplitude from the top of the raster to the center, at which point its phase is reversed, and increases in amplitude from the center to the bottom of the raster. This correction circuit superimposed on the vertical scan current produces the familiar bow tie waveform pattern.

U.S. application Ser. No. 595,809, filed July 14, 1975 issued Sept. 13, 1977 as U.S. Pat. No. 4,048,544 for Peter Eduard Haferl and entitled "SWITCHED VERTICAL DEFLECTION SYSTEM" discloses an arrangement in which horizontal rate energy is coupled to charge a capacitor in parallel with vertical deflection coils, the discharge of the capacitor through the coils providing the vertical scanning current. For the first half of the vertical interval horizontal energy of one polarity and in decreasing amounts charges the capacitor. During the second half of the vertical interval horizontal energy of the opposite polarity and in increasing amounts charges the capacitor for providing the sawtooth scanning current. The horizontal rate voltage across the capacitor is integrated by the inductance of the vertical deflection coils and produces a horizontal rate current component which modulates the vertical scanning current. U.S. application Ser. No. 618,842 issued Aug. 9, 1977 as U.S. Pat. No. 4,041,354 entitled "Pincushion Correction Circuit" discloses an arrangement for utilizing this modulation to achieve north-south pincushion distortion correction. Specifically, the latter-mentioned application discloses an arrangement including two capacitors and a resonant circuit coupled to the charging capacitor for phase shifting the horizontal rate energy prior to injecting this current between the two series connected vertical deflection coils.

The phase of the horizontal rate pincushion distortion correction current component must be carefully controlled for maximum effectiveness. A manufacturer may decide to utilize a relatively high impedance deflection yoke such as one utilizing toroidal vertical windings and saddle-type horizontal windings in which the inductance of the vertical windings, even in parallel, is in the order of 20 mh compared to an inductance of about 2 mh for series-connected vertical windings of a low impedance precision type full toroidal yoke. The combination of the winding inductance and the parallel capacitance described above must be selected for determining the vertical retrace period since these elements form a resonant circuit which reverses the polarity of vertical scanning current during the retrace interval. Thus, a higher impedance deflection winding would require a smaller parallel capacitor to maintain the same retrace period. Such a smaller capacitance would present a higher impedance to the horizontal rate charging current and would phase shift the horizontal rate voltage across the capacitor. In order to provide the proper phase for north-south pincushion distortion correction some arrangement for shifting the phase must be provided. As a practical matter such a circuit must also be cost effective and not disrupt the operation of the vertical deflection current generator.

SUMMARY OF THE INVENTION

A north-south pincushion distortion correction circuit includes a first capacitance coupled in parallel with a vertical deflection winding. Means are coupled to said first capacitance for charging said first capacitance with respective decreasing and increasing amounts of horizontal rate energy during respective first and second scan portions of each vertical deflection interval for providing a substantially linear vertical rate sawtooth current in said winding, said means also producing a generally sawtooth shaped horizontal rate voltage component across said first capacitance. A second capacitance is coupled in circuit with said first capacitance for being charged by said horizontal rate energy, and impedance means are coupled to said second capacitance to boost the horizontal rate sawtooth voltage developed at a junction between said first capacitance and said winding for producing a substantially symmetrical horizontal rate parabolic current component in said vertical deflection winding during said horizontal trace period for effecting north-south pincushion distortion correction.

BRIEF DESCRIPTION OF THE DRAWINGS

FIGS. 4a–4g and 5 illustrate current and voltage waveforms obtained in FIGS. 1–3.

DESCRIPTION OF THE INVENTION

Figure 1:
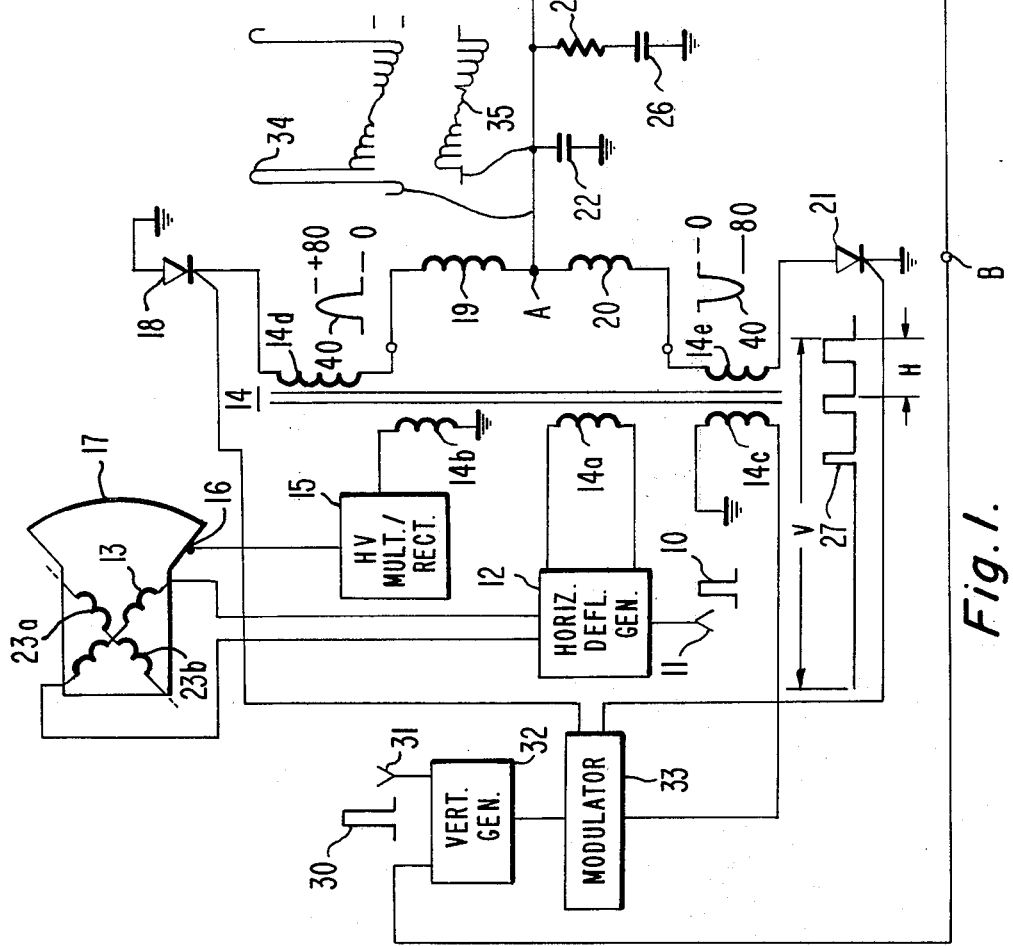
FIG. 1 is a block and schematic circuit diagram of a deflection system embodying a pincushion correction circuit according to the invention.

In FIG. 1 horizontal rate sync pulses 10 are coupled to a terminal 11 of a horizontal deflection generator 12. Generator 12 supplies scanning current to horizontal deflection coil 13 mounted around a television picture tube 17. Generator 12 also drives a primary winding 14a of a horizontal output transformer 14. A high voltage winding 14b provides retrace pulses which are rectified by a high voltage multiplier and rectifier assembly 15 for providing high voltage direct current to an ultor terminal 16 of picture tube 17. Associated with transformer 14 is a series arrangement of an SCR 18, a secondary winding 14d, inductances 19 and 20, another secondary winding 14e and a second SCR 21.

The junction of inductances 19 and 20 of terminal A is coupled to a capacitor 22, one end of resistor 25 which is serially coupled with capacitor 26 to ground, and one end of the parallelly connected vertical deflection coils 23 the other end of which are coupled through a feedback resistor 24 to ground. A voltage representative in the vertical deflection current through resistor 24 is coupled through a terminal B to one input of a vertical sawtooth generator 32. Vertical rate synchronizing pulses 30 are coupled to a terminal 31 of generator 32 to syncronize its operation. The output generator 32 is coupled to an input terminal of a pulse width modulator 33 which also is coupled to its horizontal rate pulses obtained from a secondary winding 14c of the horizontal output transformer 14.

The output of modulator 33 includes a first pulse train 27 which during each vertical interval includes horizontal rate pulses occurring during the horizontal retrace periods and which pulses have their leading edges progressively advanced in time from the first part of each vertical trace interval to the end of each vertical trace interval. Pulse train 27 thus provides gating signals for SCR 21. Although not illustrated, a complementary pulse train is applied as the gating signal for SCR 18, these pulses having their leading edges progressively advanced from the second half of each vertical trace interval towards the beginning of each vertical trace interval.

With the exception of elements 25 and 26, the circuit thus far described comprises a switched vertical deflection generator which derives the vertical scanning current from horizontal rate energy as described in detail in the aforementioned Haferl application, Ser. No. 595,809. Briefly, the switched vertical circuit operates as follows. During the first half of each vertical trace interval, SCR 18 is gated on during the horizontal retrace interval and winding 14d, providing horizontal retrace pulses 40 acts as a voltage source which charges capacitor 22 through the series path comprising SCR 18, winding 14d, inductance 19 and capacitor 22. During the second half of each vertical trace interval, winding 14e provides retrace pulses 40 which act as a voltage source which charges capacitor 22 to the opposite voltage polarity through the series path comprising SCR 21, winding 14e, inductance 20 and capacitor 22. The drive signals for the SCR's may be adjusted so that the conduction of the SCR's overlap as described in the aforementioned application. The voltage across capacitor 22 is illustrated by the vertical rate voltage waveform 34. Capacitor 22 discharges through a parallelly connected vertical deflection coils 33 and capacitor 24 to ground. The horizontal rate generating voltage for capacitor 22 is integrated by the inductance of vertical deflection coils 23 and a vertical rate sawtooth scanning current 35 flows from capacitor 22 through coils 23 and feedback resistor 24 to ground.

FIGS. 4b–4d illustrate on the same time scale operating voltage and current waveforms in relation to the horizontal retrace pulses 40 of FIG. 4a. The dashed vertical lines indicate that at the beginning of the vertical trace interval at $T_1$ a maximum amount of retrace pulse energy is coupled through the switching network to charge capacitor 22. The coupled energy is decreased until, at $T_2$, the center of the vertical scan, a minimum amount of horizontal energy is coupled to capacitor 22, and, from $T_2$ to $T_3$, increasing amounts of horizontal energy is coupled to capacitor 22.

FIG. 4c illustrates the charging current 35 which flows through the switches to charge capacitor 22. It is noted that this charging current flows even after the duration of the retrace pulse because of the stored energy primarily in inductances 19 and 20. The voltage developed across capacitor 22 by the charging current is illustrated by voltage waveform 34 of FIG. 4b. The voltage is not a perfect sawtooth because the horizontal retrace pulses, which are the charging source voltage, are not perfectly rectangular. It is noted that the peak of sawtooth pulses 34' occurs just as the charging current reaches zero, at a point in time beyond the end of each horizontal retrace pulse 40 as described above.

Capacitor 22 discharges through vertical coils 23 for producing the vertical rate sawtooth current 36 illustrated in FIG. 4d. The horizontal rate sawtooth voltage waveforms 34 of FIG. 4b are integrated by the inductance of the coils 23, resulting in a horizontal rate parabolic current component superimposed on the vertical rate sawtooth scanning current. Since the parabolic component is formed from the sawtooth voltage which is a maximum voltage of one polarity at the beginning of vertical scan, reduces to zero at the center of scan, reverses polarity and increases to a maximum at the end of vertical scan, as illustrated in the figures, a bow tie horizontal rate parabolic current component is present during each vertical scan. Such a component, of course, reduces north-south pincushion distortion.

To most effectively correct north-south pincushion distortion, the horizontal rate parabolic current component should have a peak occurring at the center of each horizontal trace interval.

FIGS. 4e–4g illustrate in expanded scale some of the waveforms of FIGS. 4a–4d. The dashed curves 34' and 36' illustrate the horizontal rate sawtooth voltage across capacitor 22 and the horizontal rate parabolic current component traversing the vertical deflection coils, respectively. The peak of the current occurs at $T_7$, a point in time beyond the center of the horizontal trace interval $T_5 - T_4'$. The current peak delay results from the integration of the delayed sawtooth voltage 34' which was developed by the charging current 35 of capacitor 22 extending beyond the end of the horizontal retrace interval as described above.

Figure 2:
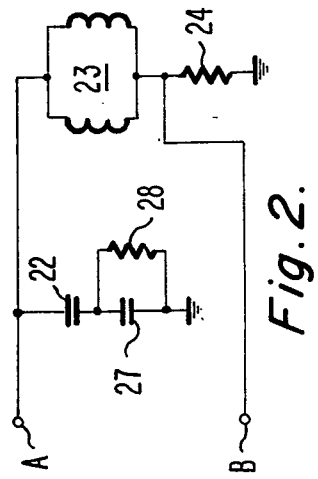
FIGS. 2 and 3 are alternative arrangements utilized in conjunction with FIG. 1 yielding further embodiments of the invention.
Figure 3:
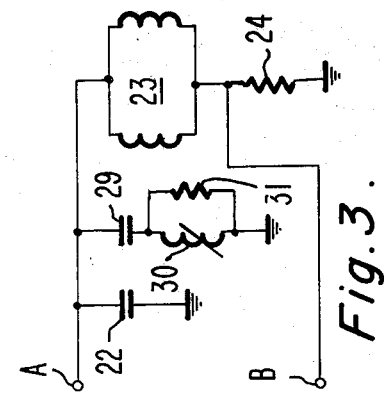

A major function of resistor 25 and capacitor 26 of FIG. 1, and of the arrangements in FIGS. 2 and 3, is to shape and effectively phase shift the horizontal sawtooth voltage to appear as curve 34 of FIG. 4f relative to the curve 34'. Such a voltage, when integrated by coils 23, results in a horizontal rate parabolic current component such as illustrated by the curve 36 of FIG. 4g. This current has a peak at $T_6$, which is the center of the horizontal trace interval and is substantially symmetrical about $T_6$ within the trace interval $T_5 - T_4'$. Capacitor 22 by itself presents a lesser impedance to the horizontal retrace and retrace harmonic current components than the series connected elements 25 and 26. Thus, capacitor 22 charges faster than capacitor 26. However, capacitor 22 must then, by discharging, supply charging current to capacitor 26 as well as scanning current through coils 23. The relatively quick discharge of capacitor 22 initially, as capacitor 26 is still being charged, develops a voltage across resistor 25 and capacitor 26 which is boosted relative to the voltage of an arrangement in which capacitor 22 was the only charging capacitance for horizontal retrace current components. The discharge of capacitor 22 slows as capacitor 26 becomes charged during $T_5-T_6$ of the horizontal trace interval. This reshapes the horizontal sawtooth voltage such that it peaks closer to $T_5$, resulting in a shift of the horizontal rate parabolic current to $T_6$, the center of horizontal trace. The currents across capacitors 22 and 26 are illustrated respectively by curves 50 and 51 of FIG. 5.

FIG. 2 illustrates another embodiment of the invention which couples to the circuit of FIG. 1 at terminals A and B. In FIG. 2, the original capacitor 22 is supplemented by a series connected capacitor 27 which is shunted by a resistance 28. In this series arrangement capacitor 22 must also supply the charging current for capacitor 27. Thus, capacitor 22 discharges relatively quickly as capacitor 27 charges initially, causing a decrease in voltage across capacitor 22. However, the current flowing through capacitor 27 builds up a voltage across capacitor 27 and resistance 28 which adds in series with the voltage across capacitor 22. The resultant voltage across the whole network is as illustrated by voltage waveform 34 of FIG. 4f, with a boosted voltage portion following $T_5$ relative to the voltage at that point in waveform 34', the latter being produced by a single capacitor 22. As in the FIG. 1 arrangement, the network in FIG. 2 produces a horizontal rate parabolic current component which peaks at the center of the horizontal trace interval and which is substantially symmetrical about the trace center $T_6$.

FIG. 3 illustrates another arrangement which may be substituted for the network in FIG. 1 by connection at terminals A and B. In FIG. 3 capacitor 22 is supplemented by a shunt network comprising series connected capacitor 29 and inductance 30. These series elements form a series resonant circuit which is tuned to approximately the horizontal deflection rate by adjusting inductance 30. The resistance 31 shunting inductance 30 shifts the phase of the voltage across the series elements to bring the peak of the horizontal sawtooth voltage closer to $T_5$ and thereby result in a centered horizontal rate parabolic current component as described above.

In all of the embodiments in FIGS. 1-3, the total capacitance values must be approximately the same as without the additional elements because capacitor 22 and coils 23 form, during vertical retrace, a series resonant circuit which reverses the deflection winding current and thereby determines the vertical retrace interval.

What is claimed is:

1. A north-south pincushion distortion correction circuit, comprising:
    a first capacitance coupled in parallel with a vertical deflection winding;
    a charging circuit coupled to said first capacitance for charging said first capacitance with respective decreasing and increasing amounts of horizontal deflection rate energy during respective first and second portions of each vertical trace interval, the charging of said first capacitance developing a generally sawtooth shaped horizontal rate voltage at a junction of said first capacitance and said winding, and the discharging of said first capacitance providing a sawtooth shaped vertical rate scanning current in said winding;
    a second capacitance and impedance means coupled in circuit with said first capacitance and in parallel with said vertical deflection winding for altering the shape of said sawtooth shaped horizontal rate voltage at said junction by boosting the sawtooth voltage during the first half of each horizontal trace interval for producing on said vertical rate sawtooth current a substantially symmetrical horizontal rate parabolic current component during each horizontal trace interval for effecting north-south pincushion distortion correction.

2. A north-south pincushion distortion correction circuit according to claim 1 wherein said second capacitance and said impedance means are coupled in series with each other and the series circuit is coupled in parallel with said first capacitance.

3. A north-south pincushion distortion correction circuit according to claim 1 wherein said second capacitance and impedance means are coupled in parallel with each other and the parallel network is coupled in series with said first capacitance.

4. A north-south pincushion distortion correction circuit according to claim 1 wherein said second capacitance is serially coupled with said impedance means which includes an inductance, forming a series resonant circuit tuned to approximately the horizontal deflection frequency, said series circuit being coupled in shunt with said first capacitance for phase shifting said horizontal rate sawtooth voltage.

5. A north-south pincushion distortion correction circuit according to claim 4 wherein said impedance means includes a resistance in parallel with said inductance.

* * * * *